United States Patent [19]

Omori et al.

[11] Patent Number: 4,502,983

[45] Date of Patent: Mar. 5, 1985

[54] COMPOSITE SILICON CARBIDE SINTERED SHAPES AND ITS MANUFACTURE

[75] Inventors: Mamoru Omori, 18-1, 2-chome, Kano, Sendai-shi, Miyagi-ken; Humihiko Takei, Sendai, both of Japan

[73] Assignee: Mamoru Omori, Miyagi, Japan

[21] Appl. No.: 508,809

[22] Filed: Jun. 28, 1983

[51] Int. Cl.$^3$ ............................................. C04B 35/56
[52] U.S. Cl. ................................... 252/516; 252/521; 428/212; 428/408; 428/698; 501/88; 501/89; 501/152; 264/65; 264/66
[58] Field of Search ............................ 501/88, 89, 152; 264/65; 252/516, 521; 428/698, 699, 212, 408, 367

[56] References Cited

U.S. PATENT DOCUMENTS

| | | | |
|---|---|---|---|
| 3,998,646 | 12/1976 | Weaver | 501/89 |
| 4,080,415 | 3/1978 | Coppola et al. | 501/88 |
| 4,097,293 | 6/1978 | Komeya et al. | 501/87 |
| 4,354,991 | 10/1982 | Suzuki et al. | 501/89 |
| 4,372,902 | 2/1983 | Denton et al. | 501/88 |

*Primary Examiner*—Mark Bell

[57] ABSTRACT

A composite silicon carbide sintered shape is provided in two forms in which the former form includes rare earth oxides as a sintering assist, and the latter form includes rare earth oxides and/or aluminum oxide or boron oxide as a sintering assist, characterized in that both forms have a surface layer abundant in rare earth oxides. Methods for manufacturing such sintered shapes are also provided.

4 Claims, No Drawings

COMPOSITE SILICON CARBIDE SINTERED SHAPES AND ITS MANUFACTURE

BACKGROUND OF THE INVENTION

1. Field of the Invention

The present invention relates to composite sintered shapes of silicon carbide having a surface layer abundant in rare earth oxides, i.e. a surface layer containing more quantity of rare earth oxides than the interior, and method of producing such shapes. More particularly the present invention relates to composite sintered shapes of silicon carbide having a surface layer abundant in rare earth oxides of insulating property and an interior structure abundant in SiC and having a high bending strength and semi-conductive property, and method of producing such shapes.

Silicon carbide has been used for heat resisting shapes or high temperature heating element due to its excellent high temperature strength, high thermal shock resistance, acid resistance, anti-wearing property and creep resistance, and recently extended its usage to the field of high temperature construction material or anti-wearing material.

However, silicon carbide (hereinafter sometimes referred to as SiC) is generally to be sintered with difficulty, and it is infeasible to produce dense sintered shapes of high strength using SiC alone. Therefore, there have been practised by the hot pressing process wherein a sintering assist such as $Al_2O_3$, iron oxide, or AlN is added to SiC powder and mixed together, and the reaction sintering process wherein a shape of mixed powder of SiC and C is melted or reacted with gaseous silicon. However, the conventional processes involve difficulty to form the shapes of complicated configuration and not suitable to mass production. Recently, the most suitable process, pressureless sintering method has been adopted for the manufacture of SiC shapes. This method involves, as disclosed in U.S. Ser. No. 4,090,735, the steps of addition of C and B as sintering assists to SiC powder, mixing the combined powders, forming the mixed powder into green shapes and sintering the same without an application of pressure.

We invented a novel method of manufacture of silicon carbide sintered shapes with or without an application of pressure using specific sintering agents or assists of oxides as disclosed in Japanese Patent Application No. 56-044109, and U.S. Ser. No. 616,787.

In the above-mentioned prior invention, sintering assists selected from the group of rare earth oxides, and further containing one or more members selected from the group consisting of carbon, aluminum oxide and boron oxide are used as sintering assist. The amount of the assist contained in a sintered shape is 11.300 atomic % maximum for rare earth oxides, or 11.500 atomic % maximum rare earth oxides plus aluminum and/or boron oxide. Silicon carbide sintered shapes produced by the above-mentioned invention contain a rather small amount of sintering assist exsisting in the most part in the grain boundary of the shape which assists feasible sintering.

Main object of the present invention is to provide composite silicon carbide sintered shapes especially suitable for substrates of a high dielectric breakdown strength for electronic circuit having a surface layer abundant in rare earth oxides. The object may be achieved by the method defined in the appended claims.

DESCRIPTION OF THE INVENTION

Inventors have discovered that when a larger amount of sintering assist is added to SiC and mixed thereto, then the mixture is sintered into shape in which the sintering assist diffuses not only into the grain boundary of SiC polycrystal but also into the surface layer abundant in rare earth oxides having a high dielectric strength.

In other words, the composite sintered shape produced by the present invention consists of two phases, i.e., the interior abundant is silicon carbide and the surface layer abundant in rare earth oxides.

The first embodiment of the present invention provides a composite silicon carbide sintered shape containing 11.300–65.000 atomic % of at least one member in the group of rare earth oxides (hereinafter referred to as R oxides) and the remainder substantially of SiC.

R oxides contained in the composite silicon carbide sintered shape formed by the present invention is or are one or more members selected from the group of oxides of Sc, Y, La, Ce, Pr, Nd, Sm, Eu, Gd, Tb, Dy, Ho, Er, Tm, Yb and Lu.

In the first embodiment of the present invention, when the content of R oxide in a sintered shape is less than 11.300 atomic %, the formation of surface layer of oxide is insufficient, while when the content is greater than 65.000 atomic %, silicon carbide is dispersed or reacted with oxide reducing the remaining SiC amount.

The surface layer formed on the sintered shape manufactured by the first embodiment consists of R oxide and a small amount of $SiO_2$, or R oxide containing SiC dispersed therein. The interior of the shape is consisted mainly of polycrystal silicon carbide comprising R oxide in the grain boundary. The surface layer of the shape has a high specific resistance more than $10^{11}$ ohm.cm or a high insulating property, while the interior exhibits a similar level of specific resistance as that of silicon carbide. Further the interior exhibits the semi-conductive property. Since the inside silicon carbide is protected by the surface layer from the environment, when the shape is exposed at an elevated temperature, e.g 1300°–1500° C. of the air, the oxidation is reduced less than tenth compared with a shape without the layer. The thermal conductivity of the layer is less than tenth that of a shape without such layer, and for example, a shape produced in accordance with the present invention having a layer thickness of 50 μm is about one third of a shape without such layer. The bonding strength between the surface layer and the interior of the shape is sufficiently high, and the thermal shock of alternate heating and cooling in several times does not cause any separation of the bonding.

Composite silicon carbide sintered shapes produced by the second embodiment of the present invention generally consist of 0.021–65.000 atomic % of R oxide, 0.006–79.984 atomic % of either aluminum oxide (hereinafter referred to as Al oxide) or boron oxide (hereinafter referred to as B oxide), the total amount of said Al and B oxides being 11.306–80.000 atomic %, and the remainder substantially of SiC. R oxide of more than 65.000 atomic %, Al oxide or B oxide of more than 79.984 atomic %, and R oxide plus Al oxide or B oxide of more than 80.000 atomic % can not produce a desired shape because silicon carbide is dispersed in these oxides or reacted with them and is exhausted. Also combined R oxide plus Al oxide or B oxide of less than 11.306 atomic % can not produce a desired surface layer.

The surface layer of a composite silicon carbide sintered shape formed by the above-mentioned second embodiment comprises a mixture of three kinds of combinations of R oxide plus Al oxide; R oxide plus B oxide; R oxide plus Al oxide and B oxide; and a small amount of SiC and/or $SiO_2$ dispersed in the oxides. The interior of the shape comprises polycrystal silicon carbide including at least one oxide selected from the group consisting of R oxide, Al oxide and B oxide in the grain boundary. Specific resistance of the surface layer of these shapes is more then $10^{11}$ ohm.cm providing a high insulating property while specific resistance of the interior is similar level to that of normal silicon carbide shapes providing the semi-conductive property. Since the oxides in the layer protect the inside silicon carbide from the oxidation of the shape under an elevated temperature, e.g. 1300°–1500° C. of the air, the resistance is reduced less than tenth in comparison with that of the shapes without the surface layer. A larger amount of B oxide in the layer tends to flow out of the surface with the other R and Al oxides, and makes difficult to form a stable oxide layer. Therefore, the amount should be less than 40% by weight. Thermal conductivity of the surface layer is less than tenth of that of the normal SiC sintered shapes. For example, shapes in accordance with the present invention having a surface layer of 100 μm thickness exhibit about 1/2.5 of that of normal SiC shapes without the surface layer. Bonding between the layer and the interior is confirmed of sufficient high strength to resist the separation after an alternate thermal shock test including successive heating and cooling. Now manufacture of composite silicon carbide sintered shapes by the present invention will be described.

In accordance with the present invention, at least one of alpha-SiC, beta-SiC and amorphous SiC may be used. It has been found that the material comprising beta-SiC or amorphous SiC fine powder with addition of 0.1–10% by weight of alpha-SiC controls non-uniform growth of SiC grain providing high hot strength and creep resistance. It is preferable to use SiC powder which is removed of impurities to form the sintered shapes of the present invention.

As SiC material, SiC fines or compounds including silicon-carbon bond, for example, organic silicon compounds or organic high molecular silicon compounds, or mixture thereof may be used.

In accordance with the present invention, following groups of sintering assists may be used:
(a) rare earth elements and rare earth compounds;
(b) less than 99% by weight of at least one member selected from the group consisting of aluminum, carbon, boron and compounds thereof and the balance substantially being at least one member selected from the group consisting of rare earth elements and rare earth compounds.

The above-mentioned R compounds, aluminum compounds and boron compounds include the respective oxides or composite oxides, hydroxides, acid adducts of hydroxides, phosphates, carbonates, basic carbonates, nitrates, sulfates, organic acid salts, halides, organic metal compounds, chelate compounds and alcoholates.

The acid adduct of hydroxides in the above-listed sintering assists are synthesized by reaction of the hydroxides with acids. When lesser equivalent of the acid than metal element equivalent in the hydroxide is reacted with said hydroxide, the acid reacts with a part of the metal element to form acid adduct which is dissolved in water. These acids include hydrochloric, sulfuric, nitric, hydrofluoric, phosphoric, perchloric, carbonic acids, organic acids (formic, acetic, propionic, tartaric, fumaric, lactic, oxalic, stearic, maleic, bonzoic, malic, malonic, citric and lactic acids) and others.

In accordance with the present invention, a mixture of silicon carbide fines and sintering assists may be prepared by the following four methods. The first method is mixing of sintering assists (oxides, hydroxides and metal elements) insoluble in a solvent and silicon carbide fines. In this method, dry mixing process is performed with a mixer for a sufficient time of period, while wet mixing process is performed with a solvent such as alcohols. The second method is adopted when a sintering assist (e.g. acid adducts of hydroxides, nitrates, sulfates, organic acid salts, basic carbonates, carbonates, phosphates, perchlorates, halides, organic metal compounds, alcoholates, chelate compounds etc.) is soluble in a solvent. The sintering assist is dissolved in solvent such as water, alcohols, ethers, ketones, hydrocarbons, DMSO, DMF and others and mixed with silicon carbide fines in a blender for a sufficient time of period. In the mixing operation silicon carbide fines are covered by membrane of the assist, and a rather small quantity of the assist provide a sufficient sintering effect. Examples of the sintering assists soluble in solvents are as follows: Acid adducts of hydroxide are soluble in water. Some alcoholates are soluble in ethers and aromatic hydrocarbons. Some chelate compounds are soluble in water, alcohols, ethers, and hydrocarbons. Some chelate compounds are soluble in water, alcohols, ethers, and hydrocarbons. Organic metal compounds are soluble in organic solvents such as hydrocarbons and ethers. Some of nitrates, sulfates, organic acid salts and halides are soluble in water.

The third method is adopted when the sintering assists are in liquid form under the ambient temperature or may be melted under heating (e.g. some of organic metal compounds, chelate compounds and organic acid salts). The sintering assist and silicon carbide fines are mixed with or without heating and blended together for a sufficient time of period.

The fourth method is a combination of the above-mentioned first through third methods, for example, when the sintering assist include two or more kinds of compounds, a solution of the assist is mixed in silicon carbide fines.

In manufacturing of the sintered shapes including a rather large quantity of oxides in accordance with the present invention, they tend to be cracked during the sintering operation. The fourth method mentioned above is advantageous to prevent the cracking failure. The amount of the assist necessary to sinter SiC is several percent of the oxide. To perform an effective blending of the assists and SiC powder, a solvent soluble assist is dissolved in a solvent, then mixed with SiC powder. When an assist (e.g. oxides) insoluble in the solvent is added to the mixture, it is advantageous to minimize the occurence of cracking failure in the sintered products.

Mixing operation may be performed with conventional powder mixers or kneaders.

The atmosphere for the mixing operation may be an oxidizing one such as air, carbon dioxide gas and oxygen gas, or non-oxidizing one such as nitrogen, argon, helium, hydrogen, neon, carbon monoxide and hydrocarbon gases, or a vacuum. Mixing operation may be generally performed under the air. During the mixing under air, a part of the compounds including organic metal compound, alcoholates and complexes, chelate compounds, and halides react with oxygen, carbon dioxide gas or water to form oxides, hydroxides or carbonates. The resulting compounds in a form of microparticles adhere to SiC powder surface to promote the sintering.

The mixed material is compacted into a desired configuration to form a green shape. The compacting operation may be performed with the conventional technics as in the powder metallurgy.

When the mixed material comprises SiC fines and sintering assist in a form of powder, about one percent by weight of a lubricant such as stearic acid or its salt may be favorably used in the mold pressing.

Pressure application may be made through a single-acting, double-acting pressure or hydrostatic press etc. A pressed shape, or a compact of a rather simple configuration may be subjected to the subsequent process, but a compact having a complex configuration requires reforming operation with a grinding or milling machine. When a high mechanical strength of the shape is required for the machining, the shape may be pre-heated in a temperature range of 300°-1600° C. under an oxidizing or non-oxidizing atmosphere, or in vacuum. Also the material may be slip-cast. In the slip-casting without any solvent a dispersing medium, preferably water, added with an anti-coagulating agent is mixed with the material. On the other hand, when a solvent is used for the mixing a rather large amount of the solvent is added to form the slip-casting material. The material is poured into a mold of calcined plaster to form a green shape. SiC mixed material in a form of paste may be compacted with the injection molding process. In shaping the paste, a bonding agent is advantageously used in addition of the solvent. The bonding agent include polyvinyl alcohol, polyethylene glycol and wax which evaporate during the sintering. When a solution of the assist, e.g. acid adduct of hydroxide, is viscous, a suitable paste may be formed without any bonding agent. In this case the assist serves as a sintering and bonding agent.

A green shape thus formed is then sintered in a furnace which preferably is changeable to an oxidizing or non-oxidizing atmosphere, or to vacuum. The sintering temperature is in a range of 1600°-2300° C. A lower temperature than 1600° C. does not cause sintering reaction, while a higher temperature than 2300° C. would disintegrate SiC. The sintering of a composite SiC shape or compact may be completed in this temperature range, and the sintering at a relatively low temperature is completed with a large amount of the sintering assist. With a large size or complicated configuration of a shape, or, a sintering assist which may produce a gas during the sintering, such sintering process may advantageously performed in two stages, i.e. low and high temperature operations. An oxidizing atmosphere or vacuum is desired for the high temperature sintering. For the non-oxidizing atmosphere, nitrogen, argon, helium, neon or carbon monoxide is used. A high pressure of the atmosphere is desired, but generally, the normal pressure gives a good result. Low temperature sintering does not necessarily require non-oxidizing atmosphere or vacuum. Sintering in the air at a temperature less than 1300° C. does not cause oxidation of silicon carbide. In this case sintering assists other than oxides will oxidize during the sintering, but such assists in the form of oxide do not give any adverse effect on the sintering operation. For example, sintering assists other than rare earth elements, aluminum metal, boron and their oxides are partly or wholly oxidized, but no disadvantages effect occur.

Temperature raising rate varies depending on the size of a shape. Larger the size a slower rate is appropriate. The rate up to 1600° C. for one hour may be applied because the sintering does not proceed to a large extent, but when the assists other than oxides and metals are used they cause reaction and produce even a small amount of a gas, therefore the rate up to 1600° C. for over three hours are desired. A slow rate, e.g. 7° C./min. higher than 1600° C. will gives good results to avoid shrinkage of the shape.

A composite product sintered at a high temperature including aluminum, boron in its initial composition loses a part of these assists and the compounds. Specifically, aluminum or boron compound reacts with rare earth compunds during the sintering and then decomposes at a high temperature, and a part of aluminum or boron react with silicon compound (mainly oxide) on the SiC particle surface to evaporate. The remaining part of the oxide existing in the grain boundary of SiC polycrystal promotes the sintering, and further additional oxide diffuses to form the surface layer of the sintered shape. The oxide component in the layer consist of; mixtures of a small amount of SiC and/or $SiO_2$ plus R oxide; R oxide plus Al oxide; R oxide plus B oxides; and R oxide plus Al and B oxides. In other words, the oxide component includes a small amount of $SiO_2$ and a small amount of SiC dispersed therein. When a large amount of B oxide is used it will melt at a relatively lower temperature during the sintering operation and flow out of the surface. Therefore a lesser amount than 40% by weight of B oxide in total oxides gives a desired results.

Carbon is added together with oxide or similar compounds. When a large amount of carbon is used it remains in the composite sintered shape to deteriorate its oxidation resistance at a high temperature. Therefore, a lesser amount than 10% by weight of carbon react with sintering assists and $SiO_2$ and is exhausted.

Carbon and carbon compounds to be mixed in the green shape include acetylene black, carbon black, graphite powder, coal fines; active carbon, high molecular aromatic compounds (e.g. tar and pitch) and organic compounds leaving carbon after sintering (e.g. phenol resin, aniline formaldeyde resin, cresol formaldehyde resin and furan resin).

It is already known that carbon or carbonaceous compounds mixed in a green shape react with $SiO_2$ membrane around SiC particle and promote bonding to SiC particles due to the existence of boron. Inventors believe the bonding between the particles is strengthened by the existence of rare earth oxides in accordance with the present invention.

Combined use of sintering assists, aluminum, aluminum compound plus carbon, carbonaceous compounds plus boron, boron compounds, with rare earth elements and rare earth compounds is believed to promote the respective sintering effects of aluminum, boron and carbon.

The present invention may be practised with sintering under either pressurized or pressureless conditions. Specifically, composite sintered shapes having high density and high bending strength may be obtained by the pressureless sintering. A part of rare earth elements, boron and aluminum mixed in SiC powder as sintering assist, remains in a form of oxide within SiC boundary, and the remaining part disperses outward to form the surface layer. Such sintering under pressure causes similar reaction, and provides further advantage of better control on uniform quality. The pressure sintering may be performed with hot pressing, hot isostatic pressing or sintering under pressurized atmosphere.

Now reason for limiting the composition range in the present invention are explained in the following.

In a composite SiC sintered shape produced by the first embodiment of the present invention, when the content of rare earth oxide is less than 11.300 atomic %, the formation of the surface oxide layer is insufficient, while when the content is larger than 65.000 atomic %, SiC in the interior of the shape disperses in the oxides or becomes unreactive to make the formation of a desired shape difficult. Therefore, the content of rare earth oxide should be limited in a range of 11.300-65.000 atomic %.

In a composite SiC sintered shape produced by the second embodiment of the present invention, when the content of rare earth oxide is less than 0.021 atomic %, since an action to promote the sintering is less effective it is difficult to increase the density of the shape, while when the content is larger than 65.000 atomic %, SiC in the interior of the shape disperses in the oxides or becomes unreactive. Therefore the content of rare earth oxide should be limited in a range of 0.021-65.000 atomic %.

When the content of oxides of aluminum and boron is less than 0.006 atomic %, since an action to promote the sintering is less effective, it is difficult to increase the density of the shape, while when the content is larger than 79.984 atomic %, SiC in the interior dispreses in oxides and becomes unreactive, the content of oxides of aluminum and boron should be limited in a range of 0.006-79.984 atomic %. Further, when the total amount of the above-mentioned rare earth oxides and aluminum oxide and/or boron oxide is less than 11.306 atomic %, the formation of the surface layer of oxide is insufficient, while the amount is larger than 80.000 atomic %, SiC in the interior of the shape disperses in the oxides and becomes unreactive to make the formation of the desired shape difficult. Therefore, the total amount of the above-mentioned two kinds of oxides should be limited in a range of 11.306-80.000 atomic %.

In the manufacture of sintered shape by the present invention, the amount of rare earth elements or rare earth compounds in the sintering assists to be added to SiC powder described in the appended claim 3, the amount of sintering assist on the rare earth oxide basis should be limited in a range of 11.300-65.000 atomic % (sum of SiC plus assist being 100 atomic %). When the amount is less than 11.300 atomic %, the formation of the surface layer of a sintered shape is insufficient, while when the amount is larger than 65.000 atomic %, SiC in the interior of the shape disperses in the oxides or becomes unreactive, and it is difficult to form a desired sintered shape.

On the other hand, the invention described in the appended claim 4, the amount of rare earth elements, aluminum, carbon, boron, and their compounds should be limited in a range of 0.021-65.000 atomic % on the rare earth oxide basis (sum of SiC and oxides being 100 atomic %), because with a lesser amount than 0.021 atomic %, an action to promote the sintering is less effective to make the formation of a desired shape of high density, while a larger amount than 65.000 atomic % within the interior of the shape disperses and becomes unreactive, and the formation of a desired composite sintered shape can not be performed.

The amount of aluminum, carbon, boron and their compounds should be limited in a range of 0.006-85.000 atomic % on the total oxide basis, because a lesser amount than 0.006 atomic % is less effective to promote the sintering to make the formation of a desired composite shape difficult, while with a larger amount than 85.000 atomic % SiC within the interior of the shape disperses in the oxides or becomes unreactive, and the formation of a desired shape can not be performed.

The composite silicon carbide sintered shapes produced by the present invention are composed of the ingredients described in the appended claims 1 and 2.

Though not described in claims 1 and 2, impurities in SiC material used in the present invention, e.g. $SiO_2$, Fe, Co, Al, Ca, free carbon and other trace elements, are generally existing in the material. Therefore, the sintered shapes produced from such material fall within the scope of the present invention.

Now some examples of the present invention will be described in the following.

EXAMPLE 1

1 g of scandium oxide is dissolved in 20 ml of hot 2 N-hydrochloric acid solution, then 5 ml of aqueous ammonia is added to precipitate scandium hydroxide. The precipitate is separated by filtering and washed with distilled water several times and 20 ml of 1 N-hydrochloric acid solution is added to the precipitate. 12 g of beta-SiC and 6 g of $La_2O_3$ are mixed with the reaction solution, and water is removed by evaporation. The dried powder is initially pre-shaped by a single-acting press then compacted with a hydrostatic press under $2 \times 10^2$ MPa to form a green shape. The green shape is burnt in the primary firing in the art at a rate of 100° C./h up to 500° C. The burnt shape is sintered in Tanmmann furnace under argon atmosphere in a temperature range of 500°-1900° C. at a rate of 200°/h and held at 1900° C. for one hour to obtain a composite SiC sintered shape. The surface layer of the shape is composed of mixed oxides of $Sc_2O_3$, and the interior comprises silicon carbide. The shape exhibits 70 kg/mm$^2$ of bending strength and oxidizing rate at 1400° C. is one-fifteenth of a shape produced with sintering assists of B and C. The specific resistance of the shape is $3 \times 10^{12}$ ohm-cm.

EXAMPLE 2

9 g of yttrium oxide is dissolved in 180 ml of 2 N-hydrochloric acid, and 30 ml of aqueous ammonia is added to precipite yttrium hydroxide which is separated by filtering. The resulting yttrium hydroxide is mixed with 260 ml of formic acid solution of pH 2, and agitated for four hours at room temperature to cause a reaction. The reacting solution is condensed under a reduced pressure and dried in vacuum to obtain 18.5 g of acid adduct of yttrium hydroxide. On the other hand, 30 g of aluminum isopropoxide is dissolved in 120 ml of benzene, and 200 ml of 1 N-hydrochloric acid solution is added. The resulting aluminum hydroxide immediately reacts with hydrochloric acid, and the reaction is completed within several hours. The mixed solution is condensed under a reduced pressure and dried in vacuum to obtain 20 g of acid adduct of aluminum hydroxide. 1.5 g of the acid adduct of yttrium hydroxide and 1.5 g of aluminum hydroxide are dissolved in about 10 ml of water. 16.5 g of beta-SiC (containing 5% of alpha- SiC) particles having average size of 0.27 μm, and 10.5 g of $Y_2O_3$ are added to the solution, and mixed, then the solution is dried. The dried powder is placed in a metal mold, and pre-shaped with a single-acting press, then compacted with a hydrostatic press at a pressure of $2\times10^2$ MPa to form a green shape. The green shape is burnt in the air to a temperature of 500° C. at a rate of 100° C./h. Then the shape is sintered in a temperature range of 500°–1950° C. at a rate of 200°C./h and held at this temperature 1950° C. for 30 minutes to obtain a composite sintered shape. The shape exhibits the bending strength of 80 kg/mm² and the oxidizing rate is 1/12 of a sintered SiC shape produced with sintering assist of B and C, and the thermal conductivity is four times higher than that of the latter shape. The specific resistance is $1\times10^{12}$ ohm-cm.

EXAMPLE 3

10 g of a composite oxide $Al_2Y_4O_9$ is ground into particles having a size less than 1 μm, and 30 g of alpha-SiC powder having an average size of 0.40 μm and 2 g of boric acid are added to the oxide. The mixture is broken down in a pulverizer for three hours. The mixed fines added with a small quantity of water is placed in a metal mold and pre-shaped in a single-acting press then compacted in a hydrostatic press under a pressure of $2\times10^2$ MPa to form a green shape. The green shape is burnt in Siliconit furnace under argon atmosphere in a temperature range from room temperature to 1300° C. at a rate of 100° C./h, then in Tammann furnace under argon atmosphere in a temperature range of 1300°–1850° C. at a rate of 100° C./h and held at this temperature for 30 minutes to obtain a composite SiC sintered shape. The shape exhibits specific resistance of $1\times10^{14}$ ohm-cm and bending strength of 60 kg/mm². Oxidizing rate at 1300° C. of the composite shape is reduced to 1/12 of that of a similar SiC sintered shape produced with a hot press using an assist of $Al_2O_3$.

EXAMPLE 4

5 g of cerium nitrate is dissolved in about 10 ml of water, and 25 g of $Ce_2O_3$, 2 g of boron, 2 g of active carbon and 50 g of beta-SiC are added and mixed together. The mixture is dried into powder form, and pre-shaped in a metal mold with a single-acting press, then a hydrostatic press at a pressure of $1\times10^2$ MPa to form a green compact or shape. The shape is burnt in Siliconit furnace under argon atmosphere to 1400° C. at a rate of 100° C./h. The burnt shape is placed in a graphite mold and sintered in a range of 1400°–2000° C. at a rate of 200° C./h in an induction furnace, and held at this temperature 2000° C. for 30 minutes to obtain a composite SiC sintered shape. The shape exhibits bending strength of 62 kg/mm² and specific resistance of $1\times10^{14}$ ohm-cm. The oxidizing rate of the shape is reduced to 1/12 of that of a similar shape produced with sintering assists of B and C.

EXAMPLE 5

3 g of neodymium acetyl acetonate and 3 g of aluminum isopropoxide are dissolved in about 10 ml of benzene, and 30 g of beta-SiC and 5 g of $Al_2O_3$ are added and mixed together. After the evaporation of benzene there is obtained dried powder which is left in the air for one week. The powder is placed in a metal mold and preshaped in a single-acting press then compacted in a hydrostatic press at a pressure of $2\times10^2$ MPa to form a green shape. The shape is burnt in a temperature range from room temperature to 500° C. at a rate of 50° C./h, then sintered in Tammann furnace under argon atmosphere in a temperature range of 500°–1900° C. at a rate of 100° C./h and held at this temperature of 1900° C. for 30 minutes to obtain a composite SiC sintered shape. The shape exhibits bending strength of 90 kg/mm² and specific resistance of $1\times10^{12}$ ohm-cm. Thermal conductivity of the shape is greater 3.5 times of that of a similar shape without the surface layer.

EXAMPLE 6

3 g of samarium acetyl acetonate are dissolved in about 10 ml of benzene, and 25 g of beta-SiC and 15 g of $Sm_2O_3$ are added and mixed together. After evaporation of benzene there is obtain dried powder. The powder is mixed with an aqueous solution of 3 g of boric acid in about 10 ml of water and mixed together. After evaporation of water there is obtained dried powder. The powder after leaving in the air for four days is placed in a metal mold and pre-shaped in a single-acting press then in a hydrostatic press to obtain a green shape. The shape is burnt in the air in a temperature range from room temperature to 500° C. at a rate of 100° C./h, then sintered in Tammann furnace under argon atmosphere in a temperature range of 500°–1900° C. at a rate of 200° C./h and held at this temperature 1900° C. for 30 minutes to obtain a composite sintered SiC shape. The shape exhibits specific resistance of $1\times10^{14}$ ohm-cm and bending strength of 74 kg/mm². The oxidizing rate of the shape at 1400° C. is 1/11 of a similar shape produced in pressureless sintering using sintering assists of B and C.

EXAMPLE 7

5 g of praseodymium propionate and 2 g of aluminum nitrate are dissolved in about 10 ml of water, and 20 g of beta-SiC, 25 g of $Pr_2O_3$ and 1 g of active carbon are added and mixed together. After evaporation of water there is obtained dried powder. The powder is placed in a metal mold and compacted in a single-acting press and then in a hydrostatic press at a pressure of $2\times10^2$ MPa to form a green shape. The shape is burnt in the air in a temperature range from room temperature to 500° C. at a rate of 50° C./h then sintered in Tammann furnace under nitrogen atmosphere in a temperature range of 500°–2000° at a rate of 200° C./h and held at this temperature 2000° C. for 30 minutes to obtain a composite SiC sintered shape. The shape exhibits specific resistance of $1\times10^{13}$ ohm-cm and bending strength of 80 kg/mm². The oxidizing rate at 1500° C. in the air is 1/13 of that of a similar shape produced with sintering assists of B and C.

EXAMPLE 8

2 g of HCOOH adduct of yttrium hydroxide produced by Example 2, and 2 g of HCl adduct of aluminum hydroxide are dissolved in about 10 ml of water, and 20 g of beta-SiC and 18 g of $Eu_2O_3$ are added and mixed together. After evaporation of water there is obtained dried powder. The powder is placed in a graphite mold and sintered in a hot press under argon atmosphere at a pressure of 100 kg/cm² and a temperature of 1800° C. for two hours to obtain a composite sintered SiC shape. The shape exhibits specific resistance of $1\times10^{12}$ ohm-cm and bending strength of 84 kg/mm².

As stated above, the composite sintered SiC shapes produced in accordance with the present invention have high density and bending strength, and excellent oxidation resistance, wear resistance, creep resistance, and thermal shock resistance. The shapes have insulating property having specific resistance more than $10^{11}$ ohm-cm and having lesser thermal conductivity than that of silicon carbide but larger than that of oxides. The composite material from which the shapes may be made are unknown in prior arts, also may be processed with pressure or pressureless sintering into various parts having complex configurations, hollow parts or thin belt-like form. Therefore, the composite sintered SiC shapes may be applicable broadly to manufacture of gas turbine blade, gas turbine parts, parts in apparatus for corrosive gases, crucibles, lining of ball mills, heat exchanger in high temperature furnace and refractory material, heating elements, burning tube, die-cast pump, thin-walled tubings, nuclear fusion reactor material, atomic reactor material, solar furnace material, tools and parts thereof, grinding material, thermal insulator, single crystal substrates for electronic devices, substrates for electronic circuits and insulating material and others.

We claim:

1. A composite silicon carbide sintered shape consisting of 11.300–65.000 atomic percent of one or more members selected from the group of rare earth oxides and balance substantially being of SiC, said shape having a surface layer abundant in rare earth oxide.

2. A composite silicon carbide sintered shape consisting of 0.021–65.000 atomic percent of one or more members selected from the group of rare earth oxides, 0.006–79.984 atomic percent of at least either member of aluminum oxide or boron oxide, total sum of said rare earth oxide plus aluminum oxide or boron oxide being 11.306–80.000 atomic percent, the balance substantially being of SiC, said shape having a surface layer abundant in rare earth oxide.

3. A method of manufacturing a silicon carbide sintered shape comprising the steps of (a) mixing silicon carbide powder with a sintering assist consisting essentially of at least one member selected from the group consisting of rare earth elements and rare earth compounds to form a mixture, the amount of said assist being in a range of 11.300–65.000 atomic percent on a rare earth oxide basis, 100 atomic percent being the sum of said assist and silicon carbide; (b) compacting said mixture at a pressure in a range from 100 MPa to 200 MPa; (c) burning said mixture in a primary firing at a temperature of from 500° to 1,400° C. for a period from 5 to 14 hours; and (d) sintering said burnt mixture at a temperature of from 1800° to 2,000° C. for a period from 6 to 14 hours in an atmosphere consisting essentially of a gas selected from the group consisting of argon and nitrogen; thereby forming in said shape a central portion and a surface layer, said surface layer being abundant in rare earth oxide, whereby said surface layer exhibits electrical insulating properties and said central portion exhibits semi-conductive properties.

4. A method of manufacturing a silicon carbide sintered shape comprising the steps of (a) mixing silicon carbide powder with a sintering assist consisting of less than 99 percent by weight of at least one member selected from the group consisting of aluminum, carbon, boron and their compounds, and the balance being of at least one member selected from the group consisting of rare earth elements and rare earth compounds, to form a mixture, the amount of said rare earth elements or their compounds being 0.021–65.000 atomic percent on their oxide basis, 100 atomic percent being the sum of said assist and silicon carbide; (b) compacting said mixture at a pressure in a range from 100 MPa to 200 MPa; (c) burning said mixture in a primary firing at a temperature of from 500° to 1,400° C. for a period from 5 to 14 hours; and sintering said burnt mixture at a temperature of from 1800° to 2,000° C. for a period from 6 to 14 hours in an atmosphere consisting essentially of a gas selected from the group consisting of argon and nitrogen; thereby forming in said shape a central portion and a surface layer, said surface layer being abundant in rare earth oxide whereby said surface layer exhibits electrical insulating properties and said central portion exhibits semi-conducting properties.

* * * * *